(12) United States Patent
Shindo et al.

(10) Patent No.: US 9,283,442 B2
(45) Date of Patent: Mar. 15, 2016

(54) GOLF BALL

(75) Inventors: Ayaka Shindo, Kobe (JP); Chiemi Mikura, Kobe (JP); Shun Kurihara, Kobe (JP); Kazuhisa Fushihara, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 269 days.

(21) Appl. No.: 13/545,658

(22) Filed: Jul. 10, 2012

(65) Prior Publication Data

US 2013/0017905 A1 Jan. 17, 2013

(30) Foreign Application Priority Data

Jul. 11, 2011 (JP) ................... 2011-152963

(51) Int. Cl.
- *A63B 37/00* (2006.01)
- *C08K 5/09* (2006.01)
- *C08K 5/098* (2006.01)
- *A63B 37/06* (2006.01)

(52) U.S. Cl.
CPC .............. *A63B 37/06* (2013.01); *A63B 37/0003* (2013.01); *A63B 37/0051* (2013.01); *A63B 37/0063* (2013.01); *C08K 5/09* (2013.01); *C08K 5/098* (2013.01)

(58) Field of Classification Search
None
See application file for complete search history.

(56) References Cited

U.S. PATENT DOCUMENTS

| | | | | |
|---|---|---|---|---|
| 4,788,229 | A * | 11/1988 | Bohm et al. | 523/215 |
| 5,018,740 | A * | 5/1991 | Sullivan | 473/372 |
| 5,403,010 | A | 4/1995 | Yabuki et al. | |
| 6,815,507 | B2 * | 11/2004 | Ohama | 525/261 |
| 6,919,393 | B2 * | 7/2005 | Mano et al. | 524/347 |
| 7,071,253 | B2 * | 7/2006 | Voorheis et al. | 524/322 |
| 2005/0187353 | A1 | 8/2005 | Goguen et al. | |
| 2005/0282659 | A1 * | 12/2005 | Kennedy et al. | 473/371 |
| 2006/0128900 | A1 | 6/2006 | Nanba et al. | |
| 2006/0135287 | A1 | 6/2006 | Kennedy, III et al. | |
| 2006/0270492 | A1 | 11/2006 | Higuchi et al. | |
| 2007/0173607 | A1 | 7/2007 | Kennedy, III et al. | |
| 2007/0281802 | A1 | 12/2007 | Watanabe et al. | |
| 2008/0194357 | A1 | 8/2008 | Higuchi | |
| 2008/0194359 | A1 | 8/2008 | Higuchi et al. | |
| 2008/0214324 | A1 | 9/2008 | Nanba et al. | |
| 2008/0274835 | A1 * | 11/2008 | Comeau et al. | 473/374 |
| 2008/0305890 | A1 * | 12/2008 | Watanabe et al. | 473/373 |
| 2009/0107608 | A1 * | 4/2009 | Sandstrom | 152/543 |
| 2009/0124757 | A1 | 5/2009 | Shindo et al. | |
| 2010/0273575 | A1 | 10/2010 | Watanabe | |
| 2010/0298067 | A1 * | 11/2010 | Watanabe | 473/373 |

FOREIGN PATENT DOCUMENTS

| | | |
|---|---|---|
| JP | 61-37178 A | 2/1986 |
| JP | 61-113475 A | 5/1986 |
| JP | 61-253079 A | 11/1986 |
| JP | 6-154357 A | 6/1994 |
| JP | 2006-167452 A | 6/2006 |
| JP | 2006-297108 A | 11/2006 |
| JP | 2006-326301 A | 12/2006 |
| JP | 2007-319660 A | 12/2007 |
| JP | 2008-523952 A | 7/2008 |
| JP | 2008-194471 A | 8/2008 |
| JP | 2008-194473 A | 8/2008 |
| JP | 2008-212681 A | 9/2008 |
| JP | 2009-119256 A | 6/2009 |
| JP | 2010-253268 A | 11/2010 |

OTHER PUBLICATIONS

English translation of the Japanese Office Action, dated Mar. 10, 2015, issued in Japanese Application No. 2011-152963.
English translation of the Japanese Notice of Reasons for Rejection dated Jun. 16, 2015, for Japanese Application No. 2011-152963.

* cited by examiner

*Primary Examiner* — David Buttner
(74) *Attorney, Agent, or Firm* — Birch Stewart Kolasch & Birch LLP

(57) ABSTRACT

An object of the present invention is to provide a golf ball showing a great flight distance on driver shots. The present invention provides a golf ball comprising a spherical core and at least one cover layer covering the spherical core, wherein the spherical core is formed from a rubber composition containing (a) base rubber, (b) an α,β-unsaturated carboxylic acid having 3 to 8 carbon atoms and/or a metal salt thereof as a co-crosslinking agent, (c) a crosslinking initiator and (d) a branched carboxylic acid and/or a salt thereof, provided that the rubber composition further contains (e) a metal compound in case of containing only (b) the α,β-unsaturated carboxylic acid having 3 to 8 carbon atoms as the co-crosslinking agent.

18 Claims, 14 Drawing Sheets

GOLF BALL

FIELD OF THE INVENTION

The present invention relates to a golf ball having a great flight distance on driver shots, in particular, an improvement of a core of a golf ball.

DESCRIPTION OF THE RELATED ART

As a method for improving a flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a lower spin rate travels a greater distance.

For example, Japanese Patent Publications Nos. S61-37178 A, S61-113475 A, S61-253079 A, 2008-212681 A, 2008-523952 T, 2009-119256 A and 2006-297108 A disclose a technique of enhancing resilience of the core. Japanese Patent Publications Nos. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended, with respect to 100 parts by weight of a rubber.

Japanese Patent Publication No. S61-253079 A discloses a solid golf ball formed from a rubber composition containing an α,β-unsaturated carboxylic acid in an amount of 15 parts to 35 parts by weight, a metal compound to react with the α,β-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an α,β-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises; (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, and (B) from 80 wt % to 0 wt % of a diene rubber other than (A) the above rubber component [the figures are represented by wt % in the case that a total amount of (A) and (B) equal to 100 wt %] and (C) an unsaturated carboxylic acid and/or a metal salt thereof.

Japanese Patent Publication No. 2006-297108 A discloses a golf ball including a solid core and a cover, wherein the solid core is formed from a composition comprising a diene rubber, a fatty acid metal salt in an amount of 6 parts or more, a cis-to-trans catalyst, and an organic peroxide in an amount of 1.2 parts or less.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organic sulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf and has the hardness distribution shown in the following table.

TABLE 1

| Hardness distribution in solid core | Shore D harness |
| --- | --- |
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organic sulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf and has the hardness distribution shown in the following table.

TABLE 2

| Hardness distribution in solid core | Shore D hardness |
|---|---|
| Center | 25 to 45 |
| Region located 5 to 10 mm from center | 39 to 58 |
| Region located 15 mm from center | 36 to 55 |
| Surface (S) | 55 to 75 |
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)–(II) in JIS-C units being within ±2; and the envelope layer, intermediate layer and cover have hardness which satisfy the condition: cover hardness>intermediate layer hardness>envelope layer hardness.

SUMMARY OF THE INVENTION

An object of the present invention is to provide a golf ball traveling a great flight distance on driver shots.

The inventors of the present invention, in order to provide a novel golf ball having an excellent flight performance, has filed a Japanese patent application regarding "a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, (d) a carboxylic acid and (e) an organic sulfur compound, provided that the rubber composition further contains (f) a metal compound in case of containing only (b) the α,β-unsaturated carboxylic acid having 3 to 8 carbon atoms as the co-crosslinking agent" (Japanese patent application No. 2011-045286).

A gist of the invention described in Japanese patent application No. 2011-045286 resides in that the spherical core has a hardness distribution where the hardness increases linearly or almost linearly from the center of the core toward the surface thereof. The spherical core having the hardness distribution where the hardness increases linearly or almost linearly from the center of the core toward the surface thereof, with a high degree of the outer-hard inner-soft structure reduces the spin rate on driver shots, thereby improving the flight performance. The reason why the spherical core has the hardness distribution where the hardness increases linearly or almost linearly from the center of the core toward the surface thereof is considered as follows. When molding the core, the internal temperature of the core is high at the core central part and decreases toward the core surface, since reaction heat from a crosslinking reaction of the base rubber accumulates at the core central part. (d) The carboxylic acid reacts with the metal salt of (b) the α,β-unsaturated carboxylic acid having 3 to 8 carbon atoms, when molding the core. That is, (d) the carboxylic acid exchanges a cation with the metal salt of the α,β-unsaturated carboxylic acid having 3 to 8 carbon atoms, thereby breaking the metal crosslinking by the metal salt of the α,β-unsaturated carboxylic acid having 3 to 8 carbon atoms. This cation exchange reaction easily occurs at the core central part where the temperature is high, and less occurs toward the core surface. In other words, the breaking of the metal crosslinking easily occurs at the core central part, but less occurs toward the surface. As a result, it is conceivable that since a crosslinking density in the core increases from the center of the core toward the surface thereof, the core hardness increases linearly or almost linearly from the center of the core toward the surface thereof.

The inventors of the present invention have found, as a result of further study, that the spherical core has a higher degree of the outer-hard inner-soft structure and provides the lower spin rate on driver shots by employing (d) a carboxylic acid having a branched structure and/or a salt thereof, and have made the present invention.

The present invention provides a golf ball comprising a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a branched carboxylic acid and/or a salt thereof, provided that the rubber composition further contains (e) a metal compound in case of containing only (b) the α,β-unsaturated carboxylic acid having 3 to 8 carbon atoms as the co-crosslinking agent. The present invention is configured as described above so that the spherical core has a higher degree of the outer-hard inner-soft structure, thereby reducing the spin rate on driver shots and providing a greater flight distance. The linearity of the hardness distribution of the spherical core used in the preset invention may be lowered partially, however, in this case, a higher degree of the outer-hard inner-soft structure is provided and thus the spin rate on driver shots is reduced.

The present invention provides a golf ball traveling a great flight distance on driver shots.

DESCRIPTION OF THE PREFERRED EMBODIMENT

Figure 1:
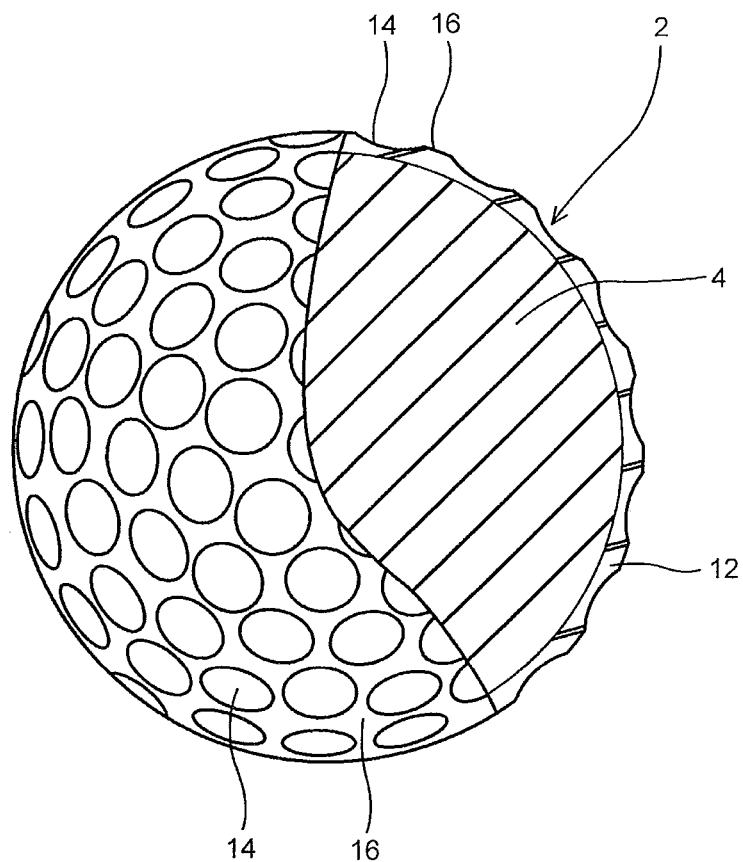
FIG. 1 is a partially cutaway sectional view showing the golf ball according to the preferable embodiment of the present invention.
Figure 2:
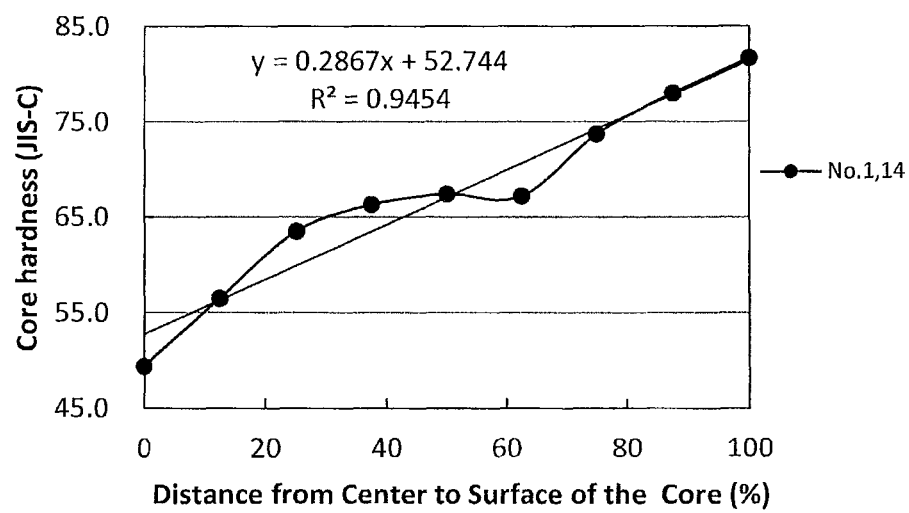
FIG. 2 is a graph showing the hardness distribution of the spherical core.
Figure 3:
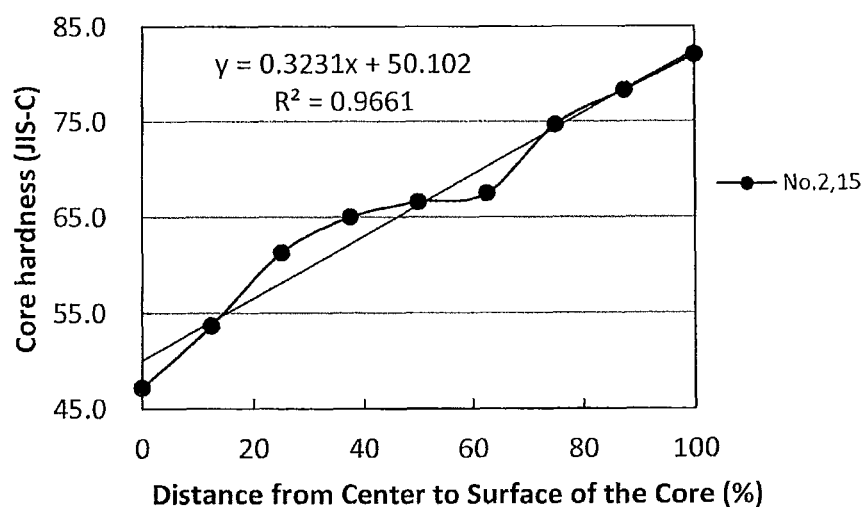
FIG. 3 is a graph showing the hardness distribution of the spherical core.
Figure 4:
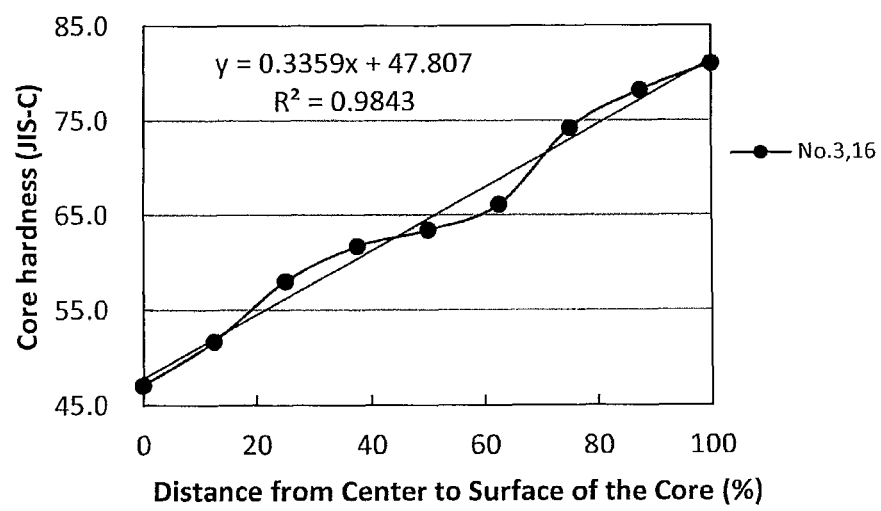
FIG. 4 is a graph showing the hardness distribution of the spherical core.
Figure 5:
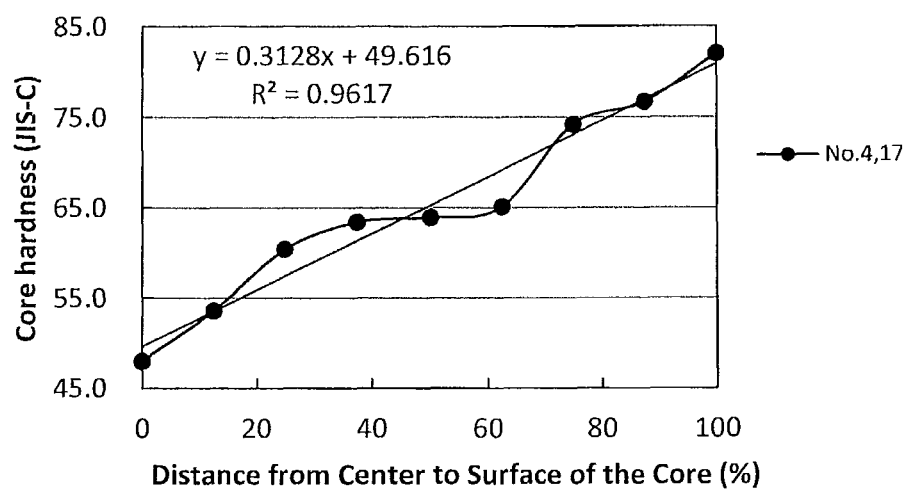
FIG. 5 is a graph showing the hardness distribution of the spherical core.
Figure 6:
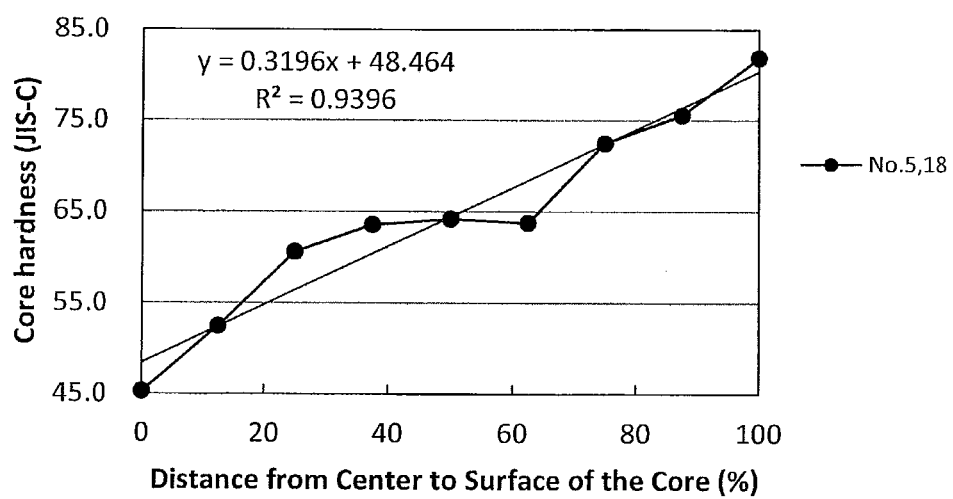
FIG. 6 is a graph showing the hardness distribution of the spherical core.
Figure 7:
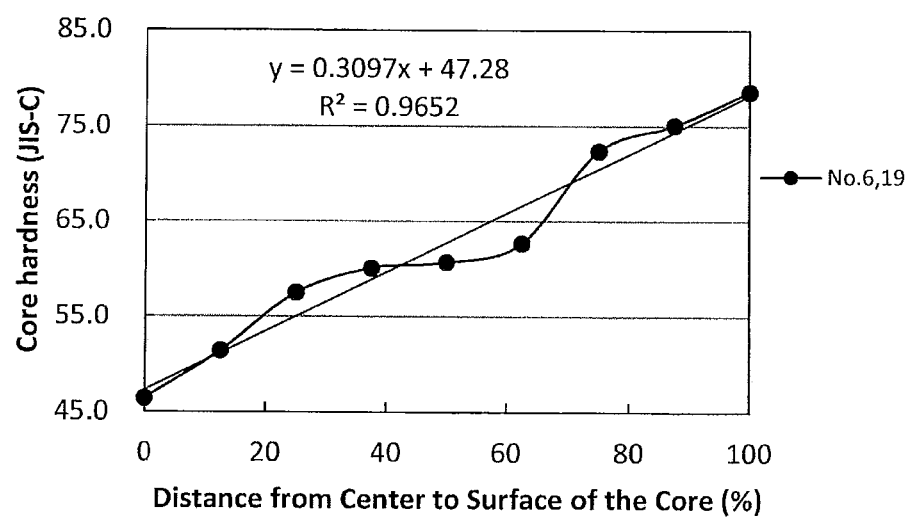
FIG. 7 is a graph showing the hardness distribution of the spherical core.
Figure 8:
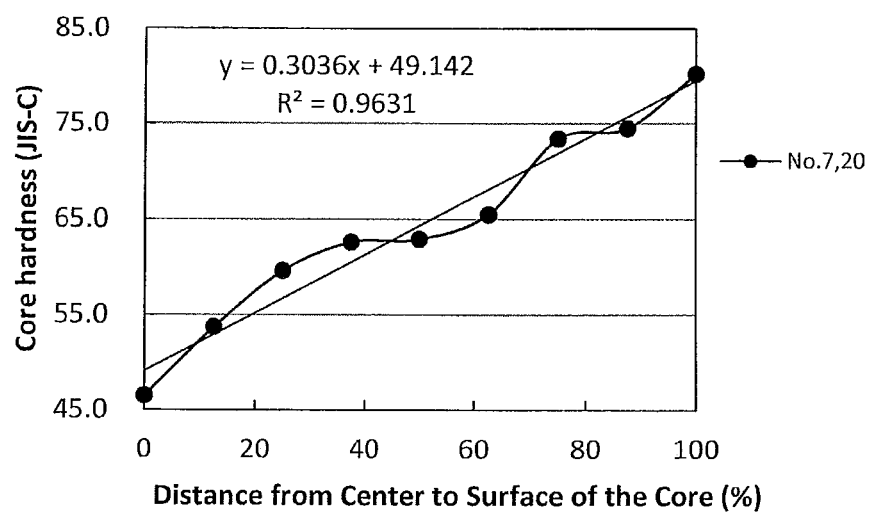
FIG. 8 is a graph showing the hardness distribution of the spherical core.
Figure 9:
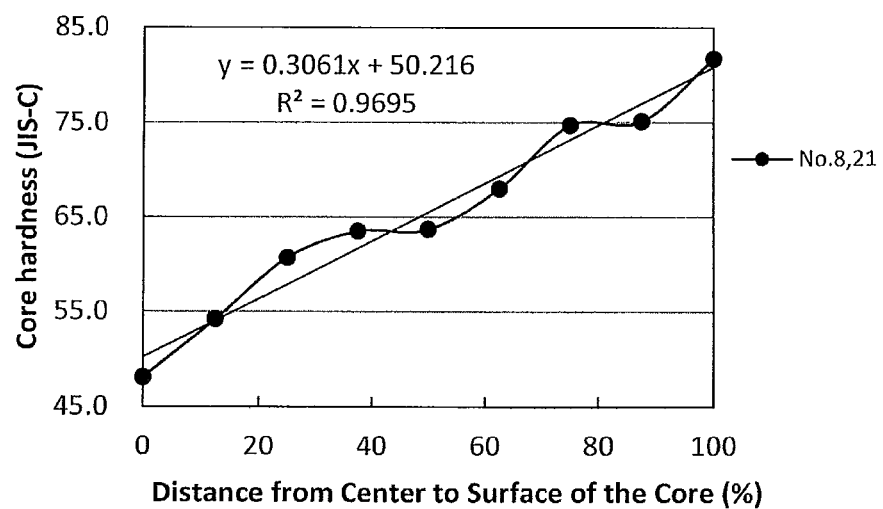
FIG. 9 is a graph showing the hardness distribution of the spherical core.
Figure 10:
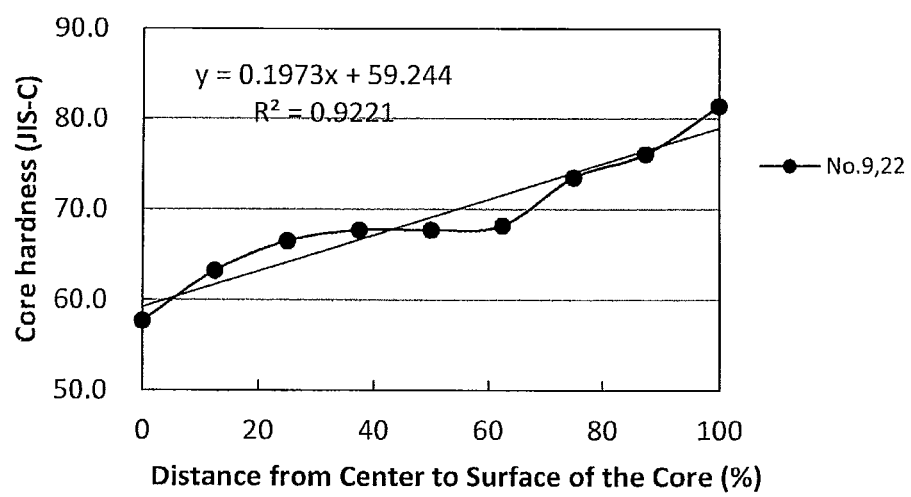
FIG. 10 is a graph showing the hardness distribution of the spherical core.
Figure 11:
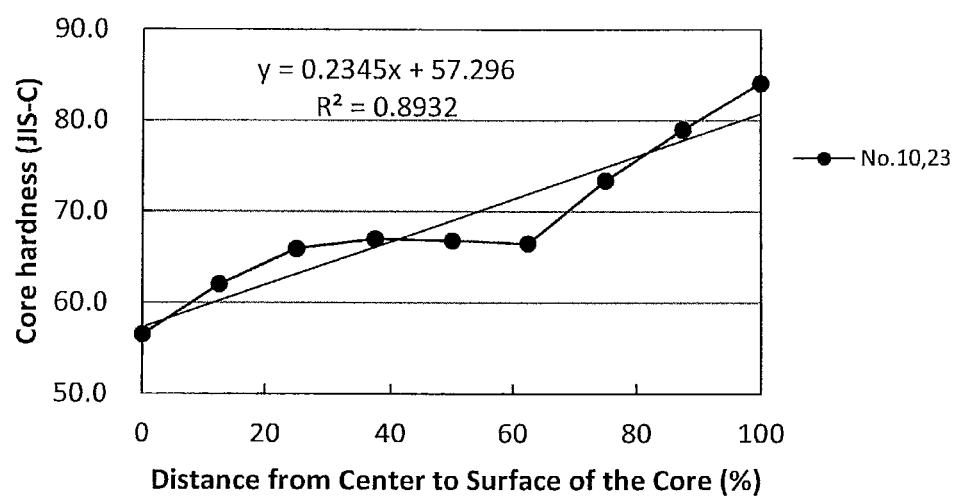
FIG. 11 is a graph showing the hardness distribution of the spherical core.
Figure 12:
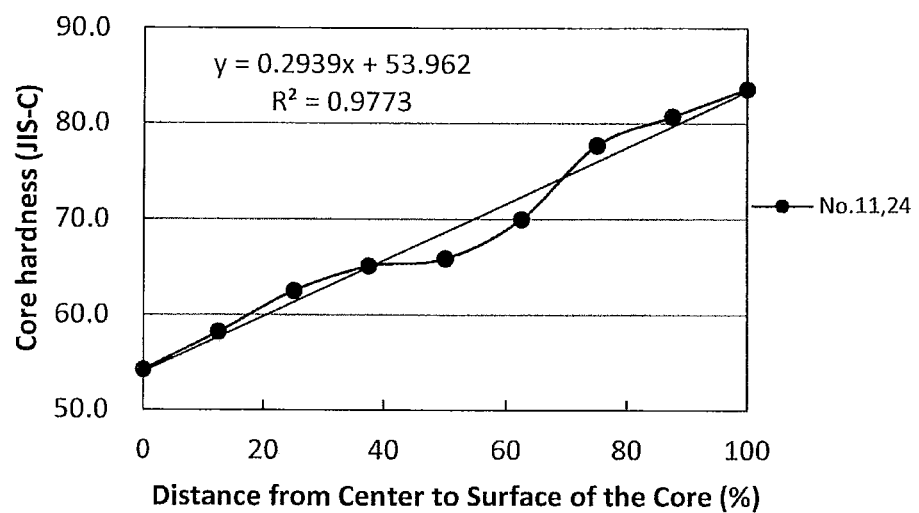
FIG. 12 is a graph showing the hardness distribution of the spherical core.
Figure 13:
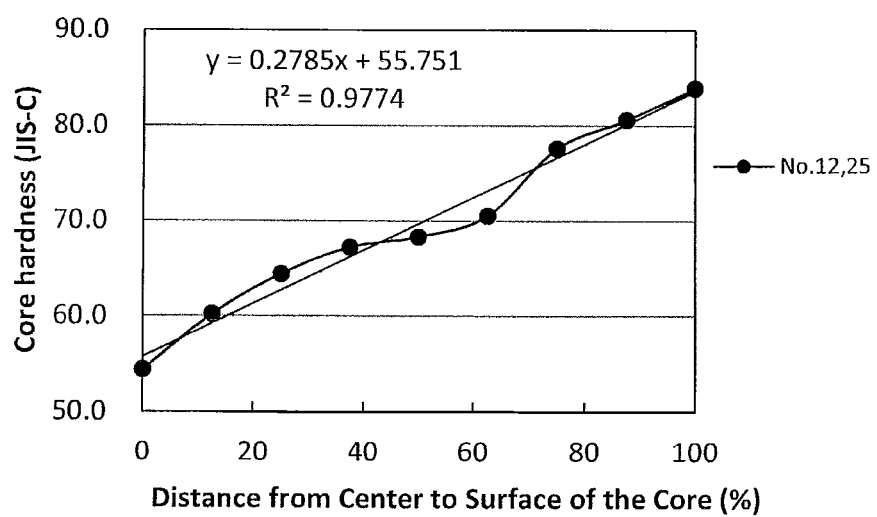
FIG. 13 is a graph showing the hardness distribution of the spherical core.
Figure 14:
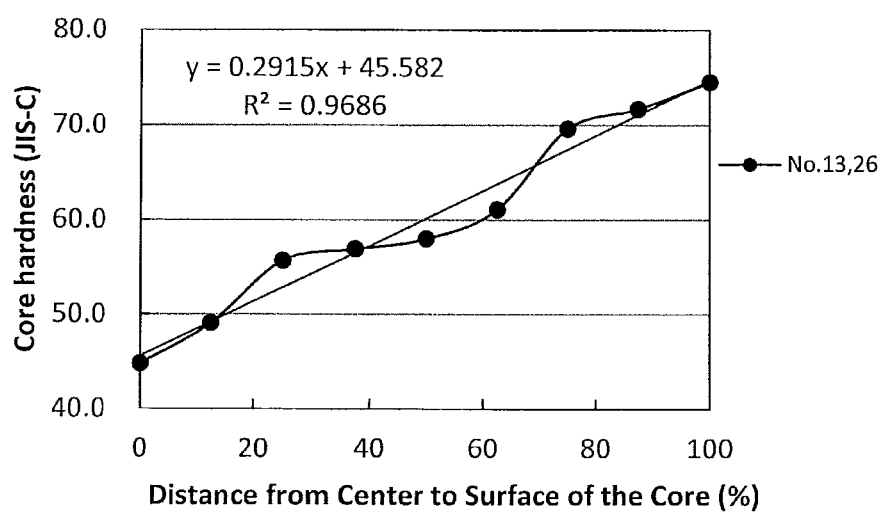
FIG. 14 is a graph showing the hardness distribution of the spherical core.

The golf ball of the present invention has a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator and (d) a branched carboxylic acid and/or a salt thereof, provided that the rubber composition further contains (e) a metal compound in case of containing only (b) the α,β-unsaturated carboxylic acid having 3 to 8 carbon atoms as the co-crosslinking agent.

First, (a) the base rubber used in the present invention will be explained. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having a cis-1,4 bond in a proportion of 40% or more, more preferably 80% or more, even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene preferably includes one synthesized using a rare earth element catalyst. When a neodymium catalyst, which employs a neodymium compound of a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of: column: GMHHXL (manufactured by Tosoh Corporation), column temperature: 40° C., and mobile phase: tetrahydrofuran, and calculated by converting based on polystyrene standard.

Next, (b) the α,β-unsaturated carboxylic acid having 3 to 8 carbon atoms and/or the metal salt thereof will be explained. (b) The α,β-unsaturated carboxylic acid having 3 to 8 carbon atoms and/or a metal salt thereof is blended as a co-crosslinking agent in the rubber composition and has an action of crosslinking a rubber molecule by graft polymerization to a base rubber molecular chain. In the case that the rubber composition used in the present invention contains only the α,β-unsaturated carboxylic acid having 3 to 8 carbon atoms as the co-crosslinking agent, the rubber composition preferably further contains (e) a metal compound as an essential component. Neutralizing the α,β-unsaturated carboxylic acid having 3 to 8 carbon atoms with the metal compound in the rubber composition provides substantially the same effect as using the metal salt of the α,β-unsaturated carboxylic acid having 3 to 8 carbon atoms. Further, in the case of using the α,β-unsaturated carboxylic acid having 3 to 8 carbon atoms and the metal salt thereof in combination, (e) the metal compound may be used as an optional component.

The α,β-unsaturated carboxylic acid having 3 to 8 carbon atoms includes, for example, acrylic acid, methacrylic acid, fumaric acid, maleic acid, crotonic acid, and the like.

Examples of the metals constituting the metal salts of the α,β-unsaturated carboxylic acid having 3 to 8 carbon atoms include: monovalent metal ions such as sodium, potassium, lithium or the like; divalent metals ions such as magnesium, calcium, zinc, barium, cadmium or the like; trivalent metals ions such as aluminum ion or the like; and other metal ions such as tin, zirconium or the like. The above metal ions can be used solely or as a mixture of at least two of them. Among these metal ions, divalent metals ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal sat, zinc acrylate is preferable, because the zinc acrylate enhances the resilience of the resultant golf ball. The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 35 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the co-crosslinking initiator which will be explained below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

Next, (d) the branched carboxylic acid and/or the salt thereof will be explained. (d) The branched carboxylic acid and/or the salt thereof used in the present invention includes any compound where at least one of hydrogens in a hydrocarbon having a branched structure is substituted with a carboxyl group and/or a salt thereof. A compound where at least one of hydrogens in an aliphatic hydrocarbon having a branched structure is substituted with a carboxyl group and/or a salt thereof is preferred, and a monocarboxylic acid where at least one of the hydrogens in an aliphatic hydrocarbon having a branched structure is substituted with a carboxyl group and/or a salt thereof is more preferred. However, (b) the α,β-unsaturated carboxylic acid having 3 to 8 carbon atoms used as the co-crosslinking agent should not be included in (d) the branched carboxylic acid and/or the salt thereof. It is conceivable that (d) the branched carboxylic acid and/or the salt thereof has an action of breaking the metal crosslinking by the metal salt of (b) the α,β-unsaturated carboxylic acid having 3 to 8 carbon atoms at the center of the core, when molding the core.

As (d) the branched carboxylic acid, a carboxylic acid having 3 to 30 carbon atoms is preferred, a carboxylic acid having 4 to 25 carbon atoms is more preferred, and a carboxylic acid having 4 to 20 carbon atoms is even more preferred. Further, (d) the branched carboxylic acid may be any one of a primary carboxylic acid, a secondary carboxylic acid or a tertiary carboxylic acid.

As (d) the branched carboxylic acid, a carboxylic acid branching at the carbon in 2-position (a position) is preferable, and a disubstituted carboxylic acid at the C-2 carbon and a trisubstituted carboxylic acid at the C-2 carbon are exemplified. The terminal of the branching chain may be further branched.

The hydrocarbon part of the branched carboxylic acid may be either a saturated hydrocarbon or an unsaturated hydrocarbon; however, a saturated hydrocarbon is preferable. Examples of the branched carboxylic acid where at least one of the hydrogens in a saturated hydrocarbon is substituted with a carboxyl group include compounds where at least one of the hydrogens in aliphatic saturated hydrocarbons having a branched structure such as propane (C3), butane (C4), pentane (C5), hexane (C6), heptane (C7), octane (C8), nonane (C9), decane (C10), undecane (C11), dodecane (C12), tridecane (C13), tetradecane (C14), pentadecane (C15), hexadecane (C16), heptadecane (C17), octadecane (C18), nonadecane (C19), icosane (C20), henicosane (C21), docosane (C22), tricosane (C23), tetracosane (C24), pentacosane (C25), hexacosane (C26), heptacosane (C27), octacosane (C28), nonacosane (C29) and triacontane (C30) is substituted with a carboxyl group.

Specific examples of the branched carboxylic acid include, for example, 2-ethylbutanoic acid (C6), 2-ethylhexanoic acid (C8), 2-propylpentanoic acid (C8), 2-butylhexanoic acid (C10), 2-ethyl-2,5-dimethylhexanoic acid (C10), 7,7-dimethyloctanoic acid (C10), 2-methyldodecanoic acid (C13), 10-methyldodecanoic acid (C13), 11-methyldodecanoic acid (C13), 2-methyltridecanoic acid (C14), 11-methyltridecanoic acid (C14), 12-methyltridecanoic acid (C14), 2-methyltetradecanoic acid (C15), 12-methyltetradecanoic acid (C15), 13-methyltetradecanoic acid (C15), 2-n-hexyldecanoic acid (C16), 2-methylpentadecanoic acid (C16), 13-methylpentadecanoic acid (C16), 14-methylpentadecanoic acid (C16), 2-methylhexadecanoic acid (C17), 14-methylhexadecanoic acid (C17), 15-methylhexadecanoic acid (C17), 15-methylheptadecanoic acid (C18), 2-methylnonadecanoic acid (C20), 18-methylnonadecanoic acid (C20), 17-methylnonadecanoic acid (C20), 2-methylicosanoic acid (C21), 18-methylicosanoic acid (C21), 19-methylicosanoic acid (C21), 2-methylhenicosane acid (C22), 19-methylhenicosane acid (C22), 20-methylhenicosane acid (C22), 2-methyldocosanoic acid (C23), 20-methyldocosanoic acid (C23), 21-methyldocosanoic acid (C23), 2-methyltricosanoic acid (C24), 21-methyltricosanoic acid (C24), 22-methyltricosanoic acid (C24), 2-methyltetracosanoic acid (C25), 22-methyltetracosanoic acid (C25), 23-methyltetracosanoic acid (C25), 2-methylpentacosanoic acid (C26), 23-methylpentacosanoic acid (C26), 24-methylpentacosanoic acid (C26), 2-methylhexacosanoic acid (C27), 24-methylhexacosanoic acid (C27), 25-methylhexacosanoic acid (C27), 2-methylheptadecanoic acid (C18), 16-methylheptadecanoic acid (C18), 2-methyloctadecanoic acid (C19), 16-methyloctadecanoic acid (C19), 17-methyloctadecanoic acid (C19), 2-n-heptylundecanoic acid (C18), 2,2,4,8,10,10-hexamethylundecane-5-carboxylic acid (C18) and the like. The branched carboxylic acid may be used alone or as a mixture of at least two of them. Among them, 2-propylpentanoic acid (C8), 2-ethylhexanoic acid (C8), 2-ethyl-2,5-dimethylhexanoic acid (C10), 7,7-dimethyloctanoic acid (C10), 2-n-hexyldecanoic acid (C16), 2-n-heptylundecanoic acid (C18), and 2,2,4,8,10,10-hexamethylundecane-5-carboxylic acid (C18) are preferable.

As the salt of (d) the branched carboxylic acid, a salt of the branched carboxylic acid described above may be used. A cationic component of the salt of the branched carboxylic acid includes a metal ion, an ammonium ion and an organic cation. Examples of the metal ion include: monovalent metal ions such as sodium, potassium, lithium, silver or the like; divalent metals ions such as magnesium, calcium, zinc, barium, cadmium, copper, cobalt, nickel, manganese or the like; trivalent metals ions such as aluminum, iron or the like; and other metal ions such as tin, zirconium, titanium or the like. The cationic component may be used alone or as a mixture of at least two of them.

The organic cation includes a cation having a carbon chain. The organic cation includes, for example, without limitation, an organic ammonium ion. Examples of the organic ammonium ion are: primary ammonium ions such as stearylammonium ion, hexylammonium ion, octylammonium ion, 2-ethyl hexylammonium ion, or the like; secondary ammonium ions such as dodecyl (lauryl) ammonium ion, octadecyl (stearyl) ammonium ion, or the like; tertiary ammonium ions such as trioctyl ammonium ion, or the like; and quaternary ammonium ions such as dioctyldimethyl ammonium ion, distearyldimethyl ammonium ion, or the like. These organic cations may be used alone or as a mixture of at least two of them.

The content of (d) the branched carboxylic acid and/or the salt thereof is preferably 0.1 part by mass or more, more preferably 0.5 part by mass or more, even more preferably 1 part by mass or more, and is preferably 30 parts by mass or less, more preferably 20 parts by mass or less, even more preferably 18 parts by mass or less with respect to 100 parts by mass of (a) the base rubber. If the content is too little, the effect of adding (d) the branched carboxylic acid is not sufficient and thus the degree of the outer-hard inner-soft structure may deteriorate. Further, if the content is too much, the hardness of the obtained core may be lowered as a whole and the resilience may be lowered.

There are cases where the surface of the zinc acrylate used as the co-crosslinking agent is treated with the branched carboxylic acid and/or the salt thereof to improve the dispersibility to the rubber. In the case of using zinc acrylate whose surface is treated with the branched carboxylic acid and/or the salt thereof, in the present invention, the amount of the branched carboxylic acid and/or the salt thereof used as a surface treating agent is included in the content of (d) the branched carboxylic acid and/or the salt thereof. For example, if 25 parts by mass of zinc acrylate whose surface treatment amount with the branched carboxylic acid and/or the salt thereof is 10 mass % is used, the amount of the branched carboxylic acid and/or the salt thereof is 2.5 parts by mass and the amount of zinc acrylate is 22.5 parts by mass. Thus, 2.5 parts by mass is counted as the content of (d) the branched carboxylic acid and/or the salt thereof.

In the case that the rubber composition used in the present invention contains only the α,β-unsaturated carboxylic acid having 3 to 8 carbon atoms as the co-crosslinking agent, the rubber composition further contains (e) a metal compound as an essential component. (e) The metal compound is not limited as long as it can neutralize (b) the α,β-unsaturated carboxylic acid having 3 to 8 carbon atoms in the rubber composition. (e) The metal compound includes, for example, metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. Among these, (e) the metal compound preferably includes a divalent metal compound, more preferably includes a zinc compound. The divalent metal compound reacts with the α,β-unsaturated carboxylic acid having 3 to 8 carbon atoms, thereby forming a metal crosslinking. Use of the zinc compound provides a golf ball with excellent resilience. (e) These metal compounds are used solely or as a mixture of at least two of them.

The rubber composition used in the present invention preferably further contains (f) an organic sulfur compound. By using (d) the branched carboxylic acid and/or the salt thereof and (f) the organic sulfur compound in combination for the rubber composition, the degree of the outer-hard and inner-soft structure of the core can be controlled, while maintaining approximate linearity of the core hardness distribution. (f) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, —S-M-S—, —S-M-S—S—, —S—S-M-S—S—, —S-M-S—S—S—, or the like; M is a metal atom). Furthermore, (f) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds. (f) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the core, (f) the organic sulfur compound preferably includes, organic compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel(II), zirconium(II), and tin (II).

Examples of the thiophenols include, for example, thiophenol; thiophenols substituted with a fluoro group, such as 4-fluorothiophenol, 2,5-difluorothiophenol, 2,4,5-trifluorothiophenol, 2,4,5,6-tetrafluorothiophenol, pentafluorothiophenol and the like; thiophenols substituted with a chloro group, such as 2-chlorothiophenol, 4-chlorothiophenol, 2,4-dichlorothiophenol, 2,5-dichlorothiophenol, 2,4,5-trichlorothiophenol, 2,4,5,6-tetrachlorothiophenol, pentachlorothiophenol and the like; thiophenols substituted with a bromo group, such as 4-bromothiophenol, 2,5-dibromothiophenol, 2,4,5-tribromothiophenol, 2,4,5,6-tetrabromothiophenol, pentabromothiophenol and the like; thiophenols substituted with an iodo group, such as 4-iodothiophenol, 2,5-diiodothiophenol, 2,4,5-triiodothiophenol, 2,4,5,6-tetraiodothiophenol, pentaiodothiophenol and the like; or a metal salt thereof. As the metal salt, zinc salt is preferred.

Examples of the naphthalenethiols (thionaphthols) are 2-naphthalenethiol, 1-naphthalenethiol, 2-chloro-1-naphthalenethiol, 2-bromo-1-naphthalenethiol, 2-fluoro-1-naphthalenethiol, 2-cyano-1-naphthalenethiol, 2-acetyl-1-naphthalenethiol, 1-chloro-2-naphthalenethiol, 1-bromo-2-naphthalenethiol, 1-fluoro-2-naphthalenethiol, 1-cyano-2-naphthalenethiol, and 1-acetyl-2-naphthalenethiol and metal salts thereof. Preferable examples include 1-naphthalenethiol, 2-naphthalenethiol and zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbamate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl)mercaptobenzothiazole, and 2-(2,6-diethyl-4-morpholinothio)benzothiazole.

(f) The organic sulfur compound can be used solely or as a mixture of at least two of them.

The content of (f) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (f) the organic sulfur compound is less than 0.05 part by mass, the effect of adding (f) the organic sulfur compound cannot be obtained and thus the resilience may not improve. If the content of (f) the organic sulfur compound exceeds 5.0 parts by mass, the compression deformation amount of the obtained golf ball becomes large and thus the resilience may be lowered.

The rubber composition used in the present invention may include additives such as a pigment, a filler for adjusting weight or the like, an antioxidant, a peptizing agent, and a softener where necessary. Further, as described above, if the rubber composition used in the present invention contains only the α,β-unsaturated carboxylic acid having 3 to 8 carbon atoms as a co-crosslinking agent, the rubber composition preferably contains (e) the metal compound.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, inorganic fillers such as zinc oxide, barium sulfate, calcium carbonate, magnesium oxide, tungsten powder, molybdenum powder, or the like. The content of the filler is preferably 0.5 part by mass or more, more preferably 1 part by mass or more, and is preferably 30 parts by mass or less, more preferably 25 parts by mass or less, even more preferably 20 parts by mass or less. If the content of the filler is less than 0.5 part by mass, it is difficult to adjust the weight, while if the content of the filler exceeds 30 parts by mass, the weight ratio of the rubber component is reduced and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and (d) the branched carboxylic acid and/or the salt thereof, and other additives where necessary. The kneading can be conducted, without any limitation, with a well-known kneading machine such as a kneading roll, a banbury mixer, a kneader, or the like.

The spherical core of the golf ball of the present invention can be obtained by molding the rubber composition after kneaded. The temperature for molding the spherical core is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes.

In a preferable embodiment, when the hardness is measured at nine points obtained by dividing a radius of the spherical core into equal parts having 12.5% interval and the hardness is plotted against distance (%) from the center of the spherical core, the spherical core is such that $R^2$ of a linear approximation curve obtained by the least square method is 0.95 or higher. If $R^2$ is 0.95 or more, the linearity of the core hardness distribution is enhanced, thus the spin rate on driver shots decreases, resulting in the greater flight distance.

The hardness of the spherical core is JIS-C hardness measured at nine points obtained by dividing a radius of the spherical core into equal parts having 12.5% interval. That is, JIS-C hardness is measured at nine points, namely at distances of 0% (core center), 12.5%, 25%, 37.5%, 50%, 62.5%, 75%, 87.5%, 100% (core surface) from the core center. Next, the measurement results are plotted to make a graph having JIS-C hardness as a vertical axis and distances (%) from the core center as a horizontal axis. In the present invention, $R^2$ of a linear approximation curve obtained from this graph by the least square method is preferably 0.95 or higher. $R^2$ of the linear approximation curve obtained by the least square method indicates the linearity of the obtained plot. In the present invention, $R^2$ of 0.95 or more means that the core has the hardness distribution where the hardness increases linearly or almost linearly. If the core having the hardness distribution where the hardness increases linearly or almost linearly is used for the golf ball, the spin rate on driver shots decrease. As a result, the flight distance on driver shots increases. $R^2$ of the linear approximation curve is preferably 0.96 or more. The higher linearity provides a greater flight distance on driver shots.

The spherical core preferably has a hardness difference (Hs−Ho) between a surface hardness Hs and a center hardness Ho of 27 or more, more preferably 28 or more, even more preferably 30 or more, and preferably has a hardness difference of 50 or less, more preferably 45 or less, even more preferably 40 or less in JIS-C hardness. If the hardness difference between the center hardness and the surface hardness is large, the golf ball having a great flight distance due to the high launch angle and low spin rate is obtained.

The spherical core preferably has the center hardness Ho of 30 or more, more preferably 40 or more, even more preferably 45 or more in JIS-C hardness. If the center hardness Ho is less than 30 in JIS-C hardness, the core becomes too soft and thus the resilience may be lowered. Further, the spherical core preferably has the center hardness Ho of 70 or less, more preferably 65 or less, even more preferably 60 or less in JIS-C hardness. If the center hardness Ho exceeds 70 in JIS-C hardness, the core becomes too hard and thus the shot feeling tends to be lowered.

The spherical core preferably has the surface hardness Hs of 76 or more, more preferably 78 or more, and preferably has the surface hardness Hs of 100 or less, more preferably 95 or less in JIS-C hardness. If the surface hardness is 76 or more in JIS-C hardness, the spherical core does not become excessively soft, and thus the better resilience is obtained. Further, if the surface hardness of the spherical core is 100 or less in JIS-C hardness, the spherical core does not become excessively hard, and thus the better shot feeling is obtained.

The spherical core preferably has the diameter of 34.8 mm or more, more preferably 36.8 mm or more, and even more preferably 38.8 mm or more, and preferably has the diameter of 42.2 mm or less, more preferably 41.8 mm or less, and even more preferably 41.2 mm or less, and most preferably 40.8 mm or less. If the spherical core has the diameter of 34.8 mm or more, the thickness of the cover does not become too thick and thus the resilience becomes better. On the other hand, if the spherical core has the diameter of 42.2 mm or less, the thickness of the cover does not become too thin, and thus the cover functions better.

When the spherical core has a diameter from 34.8 mm to 42.2 mm, a compression deformation amount (shrinking deformation amount of the spherical core along the compression direction) of the spherical core when applying a load from 98 N as an initial load to 1275 N as a final load is preferably 2.0 mm or more, more preferably 2.8 mm or more, and is preferably 6.0 mm or less, more preferably 5.0 mm or less. If the compression deformation amount is 2.0 mm or more, the shot feeling of the golf ball becomes better. If the compression deformation amount is 6.0 mm or less, the resilience of the golf ball becomes better.

The golf ball cover of the present invention is formed from a cover composition containing a resin component. Examples of the resin component include, for example, an ionomer rein; a thermoplastic polyurethane elastomer having a commercial name of "Elastollan" commercially available from BASF Japan Ltd; a thermoplastic polyamide elastomer having a commercial name of "Pebax" commercially available from Arkema K. K.; a thermoplastic polyester elastomer having a commercial name of "Hytrel" commercially available from Du Pont-Toray Co., Ltd.; and a thermoplastic styrene elastomer having a commercial name of "Rabalon" commercially available from Mitsubishi Chemical Corporation; and the like.

The ionomer resin includes a product prepared by neutralizing at least a part of carboxyl groups in the binary copolymer composed of an olefin and an α,β-unsaturated carboxylic acid having 3 to 8 carbon atoms with a metal ion, a product prepared by neutralizing at least a part of carboxyl groups in the ternary copolymer composed of an olefin, an α,β-unsaturated carboxylic acid having 3 to 8 carbon atoms, and an α,β-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Among these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among these, the ionomer resin preferably includes the metal ion-neutralized product of the binary copolymer composed of ethylene-(meth)acrylic acid and the metal ion-neutralized product of the ternary copolymer composed of ethylene, (meth)acrylic acid, and (meth)acrylic acid ester.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation.

It is noted that Na, Zn, Li, and Mg described in the parentheses after the trade names indicate metal types of neutralizing metal ions for the ionomer resins. The ionomer resins may be used solely or as a mixture of at least two of them.

The cover composition constituting the cover of the golf ball of the present invention preferably includes, as a resin component, a thermoplastic polyurethane elastomer or an ionomer rein. In case of using the ionomer rein, it is preferred to use a thermoplastic styrene elastomer together. The content of the polyurethane or ionomer resin in resin component of the cover composition is preferably 50 mass % or more, more preferably 60 mass % or more, and even more preferably 70 mass % or more.

In the present invention, the cover composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the effect of the present invention.

The amount of the white pigment (for example, titanium oxide) is preferably 0.5 part by mass or more, more preferably 1 part by mass or more, and the content of the white pigment is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the resultant cover. Further, if the amount of the white pigment is more than 10 parts by mass, the durability of the resultant cover may deteriorate.

The slab hardness of the cover composition is preferably set in accordance with the desired performance of the golf balls. For example, in case of a so-called distance golf ball which focuses on a flight distance, the cover composition preferably has a slab hardness of 50 or more, more preferably 55 or more, and preferably has a slab hardness of 80 or less, more preferably 70 or less in shore D hardness. If the cover composition has a slab hardness of 50 or more, the obtained golf ball has a high launch angle and low spin rate on driver shots and iron shots, and thus the flight distance becomes large. If the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more in shore D hardness. If the cover composition has a slab hardness of less than 50, the flight distance on driver shots can be improved by the core of the present invention, as well as the obtained golf ball readily stops on the green due to the high spin rate on approach shots. If the cover composition has a slab hardness of 20 or more, the abrasion resistance improves. In case of a plurality of cover layers, the slab hardness of the cover composition constituting each layer can be identical or different, as long as the slab hardness of each layer is within the above range.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding).

When molding the cover in a compression molding method, molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In the case of directly injection molding the cover composition, the cover composition extruded in the pellet form beforehand may be used for injection molding or the materials such as the base resin components and the pigment may be dry blended, followed by directly injection molding the blended material. It is preferred to use upper and lower molds having a spherical cavity and pimples for forming a cover, wherein a part of the pimples also serves as a retractable hold pin. When molding the cover by injection molding, the hold pin is protruded to hold the core, and the cover composition which has been heated and melted is charged and then cooled to obtain a cover. For example, it is preferred that the cover composition heated and melted at the temperature ranging from 200° C. to 250° C. is charged into a mold held under the pressure of 9 MPa to 15 MPa for 0.5 to 5 seconds, and after cooling for 10 to 60 seconds, the mold is opened and the golf ball with the cover molded is taken out from the mold.

The concave portions called "dimple" are usually formed on the surface of the cover. The total number of the dimples is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, roughly hexagonal shape, and another irregular shape. The shape of the dimples is employed solely or at least two of them may be used in combination.

In the present invention, the thickness of the cover of the golf ball is preferably 4.0 mm or less, more preferably 3.0 mm or less, even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, and even more preferably 0.8 mm or more, and most preferably 1.0 mm or more. If the thickness of the cover is less than 0.3 mm, the durability and the wear resistance of the cover may deteriorate. If the cover has a plurality of layers, it is preferred that the total thickness of the cover layers falls within the above range.

After the cover is molded, the mold is opened and the golf ball body is taken out from the mold, and as necessary, the golf ball body is preferably subjected to surface treatments such as deburring, cleaning, and sandblast. If desired, a paint film or a mark may be formed. The paint film preferably has a thickness of, but not limited to, 5 μm or larger, and more preferably 7 μm or larger, and preferably has a thickness of 50 μm or smaller, and more preferably 40 μm or smaller, even more preferably 30 μm or smaller. If the thickness is smaller than 5 μm, the paint film is easy to wear off due to continued use of the golf ball, and if the thickness is larger than 50 μm, the effect of the dimples is reduced, resulting in lowering flying performance of the golf ball.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 2.0 mm or more, more preferably 2.4 mm or more, even more preferably 2.5 mm or more, most preferably 2.8 mm or more, and is preferably 5.0 mm or less, more preferably 4.5 mm or less, even more preferably 3.6 mm or less. If the compression deformation amount is 2.0 mm or more, the golf ball does not become excessively hard, and thus exhibits the good shot feeling. On the other hand, if the compression deformation amount is 5.0 mm or less, the resilience is enhanced.

The golf ball construction is not limited, as long as the golf ball of the present invention comprises a spherical core and at least one cover layer covering the spherical core. FIG. 1 is a partially cutaway sectional view showing the golf ball 2 according to the preferable embodiment of the present invention. The golf ball 2 comprises a spherical core 4, and a cover 12 covering the spherical core 4. Plurality of dimples 14 are formed on a surface of the cover. Other portions than dimples 14 on the surface of the golf ball 2 are land 16. The golf ball 2 is provided with a paint layer and a mark layer outside the cover 12, but these layers are not depicted.

The spherical core preferably has a single layered structure. Unlike the multi-layered structure, the spherical core of the single layered structure does not have an energy loss at the interface of the multi-layered structure when hitting, and thus has an improved resilience. The cover has a structure of at least one layer, for example a single layered structure, or a multi-layered structure of at least two layers. The golf ball of the present invention includes, for example, a two-piece golf ball comprising a spherical core and a single layered cover disposed around the spherical core, a multi-piece golf ball comprising a spherical core, and at least two cover layers disposed around the spherical core (including the three-piece golf ball), and a wound golf ball comprising a spherical core, a rubber thread layer which is formed around the spherical core, and a cover disposed over the rubber thread layer. The present invention can be suitably applied to any one of the above golf balls.

EXAMPLES

Hereinafter, the present invention will be described in detail by way of example. The present invention is not limited to examples described below. Various changes and modifications can be made without departing from the spirit and scope of the present invention.

[Evaluation Methods]

(1) Compression Deformation Amount (mm)

A compression deformation amount of the core or golf ball (a shrinking amount of the core or golf ball in the compression direction thereof), when applying a load from 98 N as an initial load to 1275 N as a final load to the core or golf ball, was measured.

(2) Coefficient of Restitution

A 198.4 g of metal cylindrical object was allowed to collide with each core or golf ball at a speed of 40 m/sec, and the speeds of the cylindrical object and the core or golf ball before and after the collision were measured. Based on these speeds and the mass of each object, coefficient of restitution for each core or golf ball was calculated. The measurement was conducted by using twelve samples for each core or golf ball, and the average value was regarded as the coefficient of restitution for the core or golf ball. In tables 3 to 5, the coefficient of restitution of golf balls are shown as the difference from that of the golf ball (core) No.9. In tables 6 to 8, the coefficient of restitution of golf balls are shown as the difference from that of the golf ball (core) No.22.

(3) Slab Hardness (Shore D Hardness)

Sheets with a thickness of about 2 mm were produced by injection molding the cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(4) Hardness Distribution of Spherical Core (JIS-C Hardness)

A type P1 auto loading durometer manufactured by Kobunshi Keiki Co., Ltd., provided with a JIS-C type spring hardness tester was used to measure the hardness of the spherical core. The hardness measured at the surface of the spherical core was adopted as the surface hardness of the spherical core. The spherical core was cut into two hemispheres to obtain a cut plane, and the hardness were measured at the central point and at predetermined distances from the central point. The core hardness were measured at 4 points at predetermined distances from the central point of the cut plane of the core. The core hardness was calculated by averaging the hardness measured at 4 points.

(5) Flight Distance (m) and Spin Rate (rpm) on a Driver Shot

A metal-headed W#1 driver (XXIO S, loft: 11°, manufactured by SRI Sports Limited) was installed on a swing robot M/C manufactured by Golf Laboratories, Inc. A golf ball was hit at a head speed of 40 m/sec, and the flight distance (the distance from the launch point to the stop point) and the spin rate right after hitting the golf ball were measured. This measurement was conducted twelve times for each golf ball, and the average value was adopted as the measurement value for the golf ball. A sequence of photographs of the hit golf ball were taken for measuring the spin rate (rpm) right after hitting the golf ball. In tables 3 to 5, the flight distance and spin rate on the driver shots of golf balls are shown as the difference from those of the golf ball (core) No.9. In tables 6 to 8, the flight distance and spin rate on the driver shots of golf balls are shown as the difference from those of the golf ball (core) No.22.

[Production of Golf Balls]

(1) Production of Cores

The rubber compositions having formulations shown in Tables 3 to 8 were kneaded and heat-pressed in upper and lower molds, each having a hemispherical cavity, at 170° C. for 20 minutes to prepare spherical cores having a diameter of 39.8 mm.

TABLE 3

| | Golf ball No. | 1 | 2 | 3 | 4 | 5 |
|---|---|---|---|---|---|---|
| Rubber composition (parts by mass) | BR730 | 100 | 100 | 100 | 100 | 100 |
| | Sanceler SR | 29 | 29 | 29 | 29 | 29 |
| | Zinc oxide | 5 | 5 | 5 | 5 | 5 |
| | Barium sulfate | *1) | *1) | *1) | *1) | *1) |
| | 2-Thionaphthol | 0.32 | 0.32 | 0.32 | 0.32 | 0.32 |
| | Branched carboxylic acid A (C18) | 10 | — | — | — | — |
| | Branched carboxylic acid B (C18) | — | 10 | 15 | — | — |
| | Branched carboxylic acid C (C10) | — | — | — | 9 | — |
| | Branched carboxylic acid D (C8) | — | — | — | — | 2.5 |
| | Dicumyl peroxide | 0.8 | 0.8 | 0.8 | 0.8 | 0.8 |
| Core hardness distribution (JIS-C) | Center hardness | 49.4 | 47.2 | 47.1 | 48.0 | 45.3 |
| | 12.5% point hardness | 56.5 | 53.7 | 51.7 | 53.6 | 52.5 |
| | 25% point hardness | 63.5 | 61.3 | 58.0 | 60.4 | 60.6 |
| | 37.5% point hardness | 66.3 | 65.0 | 61.7 | 63.4 | 63.6 |
| | 50% point hardness | 67.4 | 66.6 | 63.4 | 63.9 | 64.2 |
| | 62.5% point hardness | 67.2 | 67.5 | 66.1 | 65.1 | 63.8 |
| | 75% point hardness | 73.7 | 74.7 | 74.2 | 74.2 | 72.5 |
| | 87.5% point hardness | 78.0 | 78.3 | 78.2 | 76.7 | 75.6 |
| | Surface hardness | 81.7 | 82.0 | 81.0 | 82.0 | 81.9 |
| | Surface hardness − center hardness | 32.3 | 34.8 | 33.9 | 34.0 | 36.6 |

TABLE 3-continued

| Golf ball No. | | 1 | 2 | 3 | 4 | 5 |
|---|---|---|---|---|---|---|
| | $R^2$ of approximated curve | 0.95 | 0.97 | 0.98 | 0.96 | 0.94 |
| | Slope of approximated curve | 0.29 | 0.32 | 0.34 | 0.31 | 0.32 |
| Core coefficient of restitution | | 0.018 | 0.002 | −0.016 | 0.003 | 0.002 |
| Core compression deformation amount (mm) | | 4.07 | 4.11 | 4.37 | 4.24 | 4.33 |
| Cover composition | | A | A | A | A | A |
| Cover hardness (Shore D) | | 65 | 65 | 65 | 65 | 65 |
| Cover thickness (mm) | | 1.5 | 1.5 | 1.5 | 1.5 | 1.5 |
| Ball | Driver spin rate (rpm) | −95 | −110 | −110 | −95 | −80 |
| | Driver flying distance (m) | 4.2 | 4.0 | 3.8 | 4.0 | 2.8 |
| | Coefficient of restitution | 0.008 | 0.002 | −0.016 | 0.003 | 0.002 |
| | Compression deformation amount (mm) | 3.37 | 3.41 | 3.67 | 3.54 | 3.63 |

TABLE 4

| | Golf ball No. | 6 | 7 | 8 | 9 | 10 |
|---|---|---|---|---|---|---|
| Rubber composition (parts by mass) | BR730 | 100 | 100 | 100 | 100 | 100 |
| | Sanceler SR | 29 | 29 | 29 | 23 | 30 |
| | Zinc oxide | 5 | 5 | 5 | 5 | 5 |
| | Barium sulfate | *1) | *1) | *1) | *1) | *1) |
| | 2-Thionaphthol | 0.32 | 0.32 | 0.32 | — | 0.32 |
| | Branched carboxylic acid D (C8) | 5 | — | — | — | — |
| | Branched carboxylic acid salt E (C8) | — | 3 | 6 | — | — |
| | Dicumyl peroxide | 0.8 | 0.8 | 0.8 | 0.8 | 0.8 |
| Core hardness distribution (JIS-C) | Center hardness | 46.4 | 46.5 | 48.1 | 57.7 | 56.5 |
| | 12.5% point hardness | 51.4 | 53.7 | 54.2 | 63.2 | 62.0 |
| | 25% point hardness | 57.5 | 59.6 | 60.7 | 66.5 | 65.9 |
| | 37.5% point hardness | 60.1 | 62.6 | 63.5 | 67.7 | 67.0 |
| | 50% point hardness | 60.7 | 62.9 | 63.7 | 67.7 | 66.8 |
| | 62.5% point hardness | 62.7 | 65.5 | 68.0 | 68.2 | 66.5 |
| | 75% point hardness | 72.4 | 73.4 | 74.7 | 73.5 | 73.4 |
| | 87.5% point hardness | 75.1 | 74.5 | 75.1 | 76.1 | 79.0 |
| | Surface hardness | 78.6 | 80.2 | 81.7 | 81.4 | 84.1 |
| | Surface hardness − center hardness | 32.2 | 33.7 | 33.6 | 23.7 | 27.6 |
| | $R^2$ of approximated curve | 0.97 | 0.96 | 0.97 | 0.92 | 0.89 |
| | Slope of approximated curve | 0.31 | 0.30 | 0.31 | 0.20 | 0.23 |
| Core coefficient of restitution | | −0.007 | −0.005 | 0.009 | 0.000 | 0.012 |
| Core compression deformation amount (mm) | | 4.62 | 4.26 | 4.34 | 4.29 | 4.06 |
| Cover composition | | A | A | A | A | A |
| Cover hardness (Shore D) | | 65 | 65 | 65 | 65 | 65 |
| Cover thickness (mm) | | 1.5 | 1.5 | 1.5 | 1.5 | 1.5 |
| Ball | Driver spin rate (rpm) | −100 | −100 | −100 | 0 | −10 |
| | Driver flying distance (m) | 3.9 | 4.0 | 4.1 | 0 | 1.5 |
| | Coefficient of restitution | −0.007 | −0.005 | 0.009 | 0.000 | 0.012 |
| | Compression deformation amount (mm) | 3.92 | 3.56 | 3.64 | 3.59 | 3.36 |

TABLE 5

| | Golf ball No. | 11 | 12 | 13 |
|---|---|---|---|---|
| Rubber composition (parts by mass) | BR730 | 100 | 100 | 100 |
| | Sanceler SR | 28 | 28 | 29 |
| | Zinc oxide | 5 | 5 | 5 |
| | Barium sulfate | *1) | *1) | *1) |
| | 2-Thionaphthol | 0.32 | 0.32 | 0.32 |
| | Normal carboxylic acid A (C18) | 10 | — | — |
| | Normal carboxylic acid salt B (C18) | — | 10 | — |
| | Branched carboxylic acid A (C18) | — | — | 20 |
| | Dicumyl peroxide | 0.8 | 0.8 | 0.8 |
| Core hardness distribution (JIS-C) | Center hardness | 54.2 | 54.4 | 44.8 |
| | 12.5% point hardness | 58.2 | 60.2 | 49.1 |
| | 25% point hardness | 62.5 | 64.4 | 55.7 |
| | 37.5% point hardness | 65.1 | 67.2 | 56.9 |
| | 50% point hardness | 65.9 | 68.3 | 58.0 |
| | 62.5% point hardness | 70.0 | 70.5 | 61.1 |
| | 75% point hardness | 77.7 | 77.6 | 69.6 |
| | 87.5% point hardness | 80.7 | 80.6 | 71.7 |
| | Surface hardness | 83.6 | 83.9 | 74.5 |
| | Surface hardness − center hardness | 29.4 | 29.5 | 29.7 |
| | $R^2$ of approximated curve | 0.98 | 0.98 | 0.97 |
| | Slope of approximated curve | 0.29 | 0.28 | 0.29 |
| Core coefficient of restitution | | 0.015 | 0.015 | −0.016 |
| Core compression deformation amount (mm) | | 3.94 | 3.83 | 5.41 |
| Cover composition | | A | A | A |
| Cover hardness (Shore D) | | 65 | 65 | 65 |
| Cover thickness (mm) | | 1.5 | 1.5 | 1.5 |
| Ball | Driver spin rate (rpm) | −90 | −80 | −50 |
| | Driver flying distance (m) | 3.8 | 2.9 | 1.8 |
| | Coefficient of restitution | 0.015 | 0.015 | −0.016 |
| | Compression deformation amount (mm) | 3.24 | 3.13 | 4.71 |

TABLE 6

| | Golf ball No. | 14 | 15 | 16 | 17 | 18 |
|---|---|---|---|---|---|---|
| Rubber composition (parts by mass) | BR730 | 100 | 100 | 100 | 100 | 100 |
| | Sanceler SR | 29 | 29 | 29 | 29 | 29 |
| | Zinc oxide | 5 | 5 | 5 | 5 | 5 |
| | Barium sulfate | *1) | *1) | *1) | *1) | *1) |
| | 2-Thionaphthol | 0.32 | 0.32 | 0.32 | 0.32 | 0.32 |
| | Branched carboxylic acid A (C18) | 10 | — | — | — | — |
| | Branched carboxylic acid B (C18) | — | 10 | 15 | — | — |
| | Branched carboxylic acid C (C10) | — | — | — | 9 | — |
| | Branched carboxylic acid D (C8) | — | — | — | — | 2.5 |
| | Dicumyl peroxide | 0.8 | 0.8 | 0.8 | 0.8 | 0.8 |
| Core hardness distribution (JIS-C) | Center hardness | 49.4 | 47.2 | 47.1 | 48.0 | 45.3 |
| | 12.5% point hardness | 56.5 | 53.7 | 51.7 | 53.6 | 52.5 |
| | 25% point hardness | 63.5 | 61.3 | 58.0 | 60.4 | 60.6 |
| | 37.5% point hardness | 66.3 | 65.0 | 61.7 | 63.4 | 63.6 |
| | 50% point hardness | 67.4 | 66.6 | 63.4 | 63.9 | 64.2 |
| | 62.5% point hardness | 67.2 | 67.5 | 66.1 | 65.1 | 63.8 |
| | 75% point hardness | 73.7 | 74.7 | 74.2 | 74.2 | 72.5 |
| | 87.5% point hardness | 78.0 | 78.3 | 78.2 | 76.7 | 75.6 |
| | Surface hardness | 81.7 | 82.0 | 81.0 | 82.0 | 81.9 |
| | Surface hardness − center hardness | 32.3 | 34.8 | 33.9 | 34.0 | 36.6 |
| | $R^2$ of approximated curve | 0.95 | 0.97 | 0.98 | 0.96 | 0.94 |
| | Slope of approximated curve | 0.29 | 0.32 | 0.34 | 0.31 | 0.32 |
| Core coefficient of restitution | | 0.018 | 0.002 | −0.016 | 0.003 | 0.002 |
| Core compression deformation amount (mm) | | 4.07 | 4.11 | 4.37 | 4.24 | 0.33 |
| Cover composition | | B | B | B | B | B |
| Cover hardness (Shore D) | | 47 | 47 | 47 | 47 | 47 |
| Cover thickness (mm) | | 1.5 | 1.5 | 1.5 | 1.5 | 1.5 |
| Ball | Driver spin rate (rpm) | −95 | −110 | −110 | −95 | −80 |
| | Driver flying distance (m) | 4.2 | 4.0 | 3.8 | 4.0 | 2.8 |
| | Coefficient of restitution | 0.018 | 0.002 | −0.016 | 0.003 | 0.002 |
| | Compression deformation amount (mm) | 3.87 | 3.91 | 4.17 | 4.04 | 4.13 |

TABLE 7

| | Golf ball No. | 19 | 20 | 21 | 22 | 23 |
|---|---|---|---|---|---|---|
| Rubber composition (parts by mass) | BR730 | 100 | 100 | 100 | 100 | 100 |
| | Sanceler SR | 29 | 29 | 29 | 23 | 30 |
| | Zinc oxide | 5 | 5 | 5 | 5 | 5 |
| | Barium sulfate | *1) | *1) | *1) | *1) | *1) |
| | 2-Thionaphthol | 0.32 | 0.32 | 0.32 | — | 0.32 |
| | Branched carboxylic acid D (C8) | 5 | — | — | — | — |
| | Branched carboxylic acid salt E (C8) | — | 3 | 6 | — | — |
| | Dicumyl peroxide | 0.8 | 0.8 | 0.8 | 0.8 | 0.8 |
| Core hardness distribution (JIS-C) | Center hardness | 46.4 | 46.5 | 48.1 | 57.7 | 56.5 |
| | 12.5% point hardness | 51.4 | 53.7 | 54.2 | 63.2 | 62.0 |
| | 25% point hardness | 57.5 | 59.6 | 60.7 | 66.5 | 65.9 |
| | 37.5% point hardness | 60.1 | 62.6 | 63.5 | 67.7 | 67.0 |
| | 50% point hardness | 60.7 | 62.9 | 63.7 | 67.7 | 66.8 |
| | 62.5% point hardness | 62.7 | 65.5 | 68.0 | 68.2 | 66.5 |
| | 75% point hardness | 72.4 | 73.4 | 74.7 | 73.5 | 73.4 |
| | 87.5% point hardness | 75.1 | 74.5 | 75.1 | 76.1 | 79.0 |
| | Surface hardness | 78.6 | 80.2 | 81.7 | 81.4 | 84.1 |
| | Surface hardness − center hardness | 32.2 | 33.7 | 33.6 | 23.7 | 27.6 |
| | $R^2$ of approximated curve | 0.97 | 0.96 | 0.97 | 0.92 | 0.89 |
| | Slope of approximated curve | 0.31 | 0.30 | 0.31 | 0.20 | 0.23 |
| Core coefficient of restitution | | −0.007 | −0.005 | 0.009 | 0.000 | 0.012 |
| Core compression deformation amount (mm) | | 4.62 | 4.26 | 4.34 | 4.29 | 4.06 |
| Cover composition | | B | B | B | B | B |
| Cover hardness (Shore D) | | 47 | 47 | 47 | 47 | 47 |
| Cover thickness (mm) | | 1.5 | 1.5 | 1.5 | 1.5 | 1.5 |
| Ball | Driver spin rate (rpm) | −100 | −100 | −100 | 0 | −10 |
| | Driver flying distance (m) | 3.9 | 4.0 | 4.1 | 0 | 1.5 |
| | Coefficient of restitution | −0.007 | −0005 | 0.009 | 0.000 | 0.012 |
| | Compression deformation amount (mm) | 4.42 | 4.06 | 4.14 | 4.09 | 3.86 |

TABLE 8

| | Golf ball No. | 24 | 25 | 26 |
|---|---|---|---|---|
| Rubber composition (parts by mass) | BR730 | 100 | 100 | 100 |
| | Sanceler SR | 28 | 28 | 29 |
| | Zinc oxide | 5 | 5 | 5 |
| | Barium sulfate | *1) | *1) | *1) |
| | 2-Thionaphthol | 0.32 | 0.32 | 0.32 |
| | Normal carboxylic acid A (C18) | 10 | — | — |
| | Normal carboxylic acid salt B (C18) | — | 10 | — |
| | Branched carboxylic acid A (C18) | — | — | 20 |
| | Dicumyl peroxide | 0.8 | 0.8 | 0.8 |
| Core hardness distribution (JIS-C) | Center hardness | 54.2 | 54.4 | 44.8 |
| | 12.5% point hardness | 58.2 | 60.2 | 49.1 |
| | 25% point hardness | 62.5 | 64.4 | 55.7 |
| | 37.5% point hardness | 65.1 | 67.2 | 56.9 |
| | 50% point hardness | 65.9 | 68.3 | 58.0 |
| | 62.5% point hardness | 70.0 | 70.5 | 61.1 |
| | 75% point hardness | 77.7 | 77.6 | 69.6 |
| | 87.5% point hardness | 80.7 | 80.6 | 71.7 |
| | Surface hardness | 83.6 | 83.9 | 74.5 |
| | Surface hardness − center hardness | 29.4 | 29.5 | 29.7 |
| | $R^2$ of approximated curve | 0.98 | 0.98 | 0.97 |
| | Slope of approximated curve | 0.29 | 0.28 | 0.29 |
| Core coefficient of restitution | | 0.015 | 0.015 | −0.016 |
| Core compression deformation amount (mm) | | 3.94 | 3.83 | 5.41 |
| Cover composition | | B | B | B |
| Cover hardness (Shore D) | | 47 | 47 | 47 |
| Cover thickness (mm) | | 1.5 | 1.5 | 1.5 |
| Ball | Driver spin rate (rpm) | −90 | −80 | −50 |
| | Driver flying distance (m) | 3.8 | 2.9 | 1.8 |
| | Coefficient of restitution | 0.015 | 0.015 | −0.016 |
| | Compression deformation amount (mm) | 3.74 | 3.63 | 5.21 |

*1) In tables No. 3 to 8, as to an amount of barium sulfate, adjustment was made such that the golf ball had a mass of 45.4 g.

BR730: a high-cis polybutadiene (cis-1,4 bond content=96 mass %, 1,2-vinyl bond content=1.3 mass %, Moony viscosity ($ML_{1+4}$ (100° C.)=55, molecular weight distribution (Mw/Mn)=3) available from JSR Corporation Sanceler SR: zinc acrylate (product of 10 mass % stearic acid coating) available from Sanshin Chemical Industry Co., Ltd.

Zinc oxide: "Ginrei R" manufactured by Toho Zinc Co., Ltd.

Barium sulfate: "Barium sulfate BD" manufactured by Sakai Chemical Industry Co., Ltd., adjustment was made such that the finally obtained golf ball had a mass of 45.4 g.

2-thionaphthol: available from Tokyo Chemical Industry Co., Ltd.

Dicumyl peroxide: "PERCUMYL® D" available from NOF Corporation

Branched carboxylic acid A (C18): an isostearic acid A (2-n-heptylundecanoic acid (C18)) available from Tokyo Chemical Industry Co., Ltd.

Branched carboxylic acid B (C18): an isostearic acid B (2,2,4,8,10,10-hexamethylundecane-5-carboxylic acid (C18)) available from Tokyo Chemical Industry Co., Ltd.

Branched carboxylic acid C (C10): a neodecanoic acid (7,7-dimethyloctanoic acid) available from Wako Pure Chemical Industries, Ltd.

Branched carboxylic acid D (C8): 2-propylvaleric acid (2-propylpentanoic acid) available from Wako Pure Chemical Industries, Ltd.

Branched carboxylic acid salt E (C8): Zinc 2-ethylhexanoate available from Wako Pure Chemical Industries, Ltd.

Normal carboxylic acid A: (purity of 98% or higher) n-stearic acid available from Tokyo Chemical Industry Co., Ltd.

Normal carboxylic acid salt B: (purity of 98% or higher) zinc n-stearate available from Tokyo Chemical Industry Co., Ltd.

(2) Production of Cover

Cover materials shown in Table 9 were mixed with a twin-screw kneading extruder to prepare the cover compositions in the pellet form. The extruding conditions of the cover composition were a screw diameter of 45 mm, a screw rotational speed of 200 rpm, and screw L/D=35, and the mixtures were heated to 150 to 230° C. at the die position of the extruder. The cover compositions obtained above were injection-molded onto the spherical cores to produce the golf balls having the spherical core and the cover covering the spherical core. As the cover compositions, the cover compositions having a Shore D hardness of 50 or more were used to produce the so-called distance type golf balls No.1 to No.13, and the cover compositions having a Shore D hardness of less than 50 were used to produce the so-called spin type golf balls No.14 to No.26.

TABLE 9

| Cover composition | A | B |
|---|---|---|
| Himilan 1605 | 50 | — |
| Himilan 1706 | 50 | — |
| Elastollan NY97A | — | 100 |
| Titanium oxide | 4 | 4 |
| Slab hardness (Shore D) | 65 | 47 |

Formulation: parts by mass

Himilan 1605: Sodium ion neutralized ethylene-methacrylic acid copolymer ionomer resin available from Du Pont-Mitsui Polychemicals Co., Ltd Himilan 1706: Zinc ion neutralized ethylene-methacrylic acid copolymer ionomer resin available from Du Pont-Mitsui Polychemicals Co., Ltd Elastollan NY97A: Thermoplastic polyurethane elastomer available from BASF Japan Co.

Comparing golf balls No.1 and No.2 to golf ball No.11, the golf ball using the branched carboxylic acid has the higher degree of the outer-hard inner-soft structure, when using the carboxylic acid having the same carbon number. Thus, as compared to golf ball No.11, golf balls No.1 and No.2 have a lower spin rate and greater flight distance on driver shots. From the results, the golf ball of the present invention which has a core formed from a rubber composition containing a branched carboxylic acid has a higher degree of outer-hard inner-soft structure and lower spin rate on driver shots compared to a golf ball having a core formed from a rubber composition containing a normal carboxylic acid. As a result, a golf ball having a great flight distance is obtained.

The golf ball of the present invention travels a great flight distance on the driver shots. This application is based on Japanese Patent application No. 2011-152963 filed on Jul. 11, 2011.

The invention claimed is:

1. A golf ball having a spherical core and at least one cover layer covering the spherical core, wherein the spherical core is formed from a rubber composition containing:
   (a) a base rubber,
   (b) an α,β-unsaturated carboxylic acid having 3 to 8 carbon atoms and/or a metal salt thereof as a co-crosslinking agent,
   (c) a crosslinking initiator,
   (d) a branched carboxylic acid and/or a salt thereof that is a carboxylic acid having an alkyl branch at a carbon adjacent to the carboxylic acid group and/or a salt thereof, and
   (f) an organic sulfur compound which is thiophenol or a derivative thereof, diphenyl disulfide or a derivative thereof, thionaphthol or a derivative thereof, thiuram disulfide or a derivative thereof, or a metal salt of these compounds, provided that the rubber composition further contains (e) a metal compound if only (b) the α,β-unsaturated carboxylic acid having 3 to 8 carbon atoms is employed as the co-crosslinking agent, and wherein (d) the branched carboxylic acid and/or the salt thereof is at least one selected from the group consisting of a branched carboxylic acid having 3 to 5 carbon atoms, a branched carboxylic acid having 10 to 30 carbon atoms, 2-ethyl butanoic acid (C6), 2-propyl pentanoic acid (C8) and salts thereof, and excludes (b) the α,β-unsaturated carboxylic acid having 3 to 8 carbon atoms and/or a metal salt thereof.

2. The golf ball according to claim 1, wherein the spherical core has a diameter of 38.8 mm or more and 42.2 mm or less, and if the JIS-C hardness of the spherical core is measured at nine points obtained by dividing the spherical core radius into equal 12.5% intervals, including the core center and the core surface, and the hardness values are plotted in a graph against distance (%) from the core center, then $R^2$ of a linear approximation curve obtained from a least square method of the graph is 0.95 or higher.

3. The golf ball according to claim 1, wherein the spherical core has a center hardness of 30 or more and 49.4 or less in JIS-C hardness.

4. The golf ball according to claim 1, wherein (d) the branched carboxylic acid and/or the salt thereof is a compound that includes an aliphatic hydrocarbon group having a branched structure, wherein a hydrogen in the hydrocarbon group is substituted with a carboxyl group and/or a salt thereof.

5. The golf ball according to claim 1, wherein (d) the branched carboxylic acid and/or the salt thereof is a saturated branched carboxylic acid and/or a salt thereof.

6. The golf ball according to claim 1, wherein (d) the branched carboxylic acid and/or the salt thereof is selected from the group consisting of 2-ethylbutanoic acid (C6), 2-propylpentanoic acid (C8), 2-butylhexanoic acid (C10), 2-ethyl-2,5-dimethylhexanoic acid (C10), 2-methyldodecanoic acid (C13), 2-methyltridecanoic acid (C14), 2-methyltetradecanoic acid (C15), 2-n-hexyldecanoic acid (C16), 2-methylpentadecanoic acid (C16), 2-methylhexadecanoic acid (C17), 2-methylnonadecanoic acid (C20), 2-methylicosanoic acid (C21), 2-methylhenicosane acid (C22), 2-methyldocosanoic acid (C23), 2-methyltricosanoic acid (C24), 2-methyltetracosanoic acid (C25), 2-methylpentacosanoic acid (C26), 2-methylhexacosanoic acid (C27), 2-methylheptadecanoic acid (C18), 2-methyloctadecanoic acid (C19), 2-n-heptylundecanoic acid (C18), and 2,2,4,8,10,10-hexamethylundecane-5-carboxylic acid (C18) and salts thereof.

7. The golf ball according to claim 1, wherein the rubber composition contains (d) the branched carboxylic acid and/or the salt thereof in an amount ranging from 0.1 parts to 30 parts by mass with respect to 100 parts by mass of (a) the base rubber.

8. The golf ball according to claim 1, wherein the rubber composition contains (d) the branched carboxylic acid and/or the salt thereof in an amount ranging from 1 part by mass to 18 parts by mass with respect to 100 parts by mass of (a) the base rubber.

9. The golf ball according to claim 1, wherein component (b) is a metal salt of an α,β-unsaturated carboxylic acid having 3 to 8 carbon atoms.

10. The golf ball according to claim 1, wherein the rubber composition contains (f) the organic sulfur compound in a content ranging from 0.05 part to 5 parts by mass with respect to 100 parts by mass of (a) the base rubber.

11. The golf ball according to claim 1, wherein the rubber composition contains (b) the α,β-unsaturated carboxylic acid having 3 to 8 carbon atoms and/or the metal salt thereof in an amount ranging from 15 parts to 50 parts by mass with respect to 100 parts by mass of (a) the base rubber.

12. The golf ball according to claim 1, wherein the spherical core surface hardness Hs differs from the core center hardness Ho in JIS-C hardness by a difference (Hs−Ho) in a range of from 30 to 50.

13. A golf ball having a spherical core and at least one cover layer covering the spherical core, wherein the spherical core is formed from a rubber composition containing:

(a) a base rubber, (b) an α,β-unsaturated carboxylic acid having 3 to 8 carbon atoms and/or a metal salt thereof as a co-crosslinking agent, (c) a crosslinking initiator, (d) a branched carboxylic acid having 3 to 30 carbon atoms and/or a salt thereof, and (f) an organic sulfur compound which is thiophenol or a derivative thereof, diphenyl disulfide or a derivative thereof, thionaphthol or a derivative thereof, thiuram disulfide or a derivative thereof, or a metal salt of these compounds, provided that the rubber composition further contains (e) a metal compound if only (b) the α,β-unsaturated carboxylic acid having 3 to 8 carbon atoms is employed as the co-crosslinking agent, and wherein (d) the branched carboxylic acid having 3 to 30 carbon atoms and/or the salt thereof is at least one selected from the group consisting of 2-ethyl-2,5-dimethylhexanoic acid (C10), 7,7-dimethyloctanoic acid (C10), 10-methyldodecanoic acid (C13), 11-methyldodecanoic acid (C13), 11-methyltridecanoic acid (C14), 12-methyltridecanoic acid (C14), 12-methyltetradecanoic acid (C15), 13-methyltetradecanoic acid (C15), 13-methylpentadecanoic acid (C16), 14-methylpentadecanoic acid (C16), 14-methylhexadecanoic acid (C17), 15-methylhexadecanoic acid (C17), 15-methylheptadecanoic acid (C18), 18-methylnonadecanoic acid (C20), 17-methylnonadecanoic acid (C20), 18-methylicosanoic acid (C21), 19-methylicosanoic acid (C21), 19-methylhenicosane acid (C22), 20-methylhenicosane acid (C22), 20-methyldocosanoic acid (C23), 21-methyldocosanoic acid (C23), 21-methyltricosanoic acid (C24), 22-methyltricosanoic acid (C24), 22-methyltetracosanoic acid (C25), 23-methyltetracosanoic acid (C25), 23-methylpentacosanoic acid (C26), 24-methylpentacosanoic acid (C26), 24-methylhexacosanoic acid (C27), 25-methylhexacosanoic acid (C27), 16-methylheptadecanoic acid (C18), 16-methyloctadecanoic acid (C19), 17-methyloctadecanoic acid (C19), 2,2,4,8,10,10-hexamethylundecane-5-carboxylic acid (C18) and salts thereof.

14. The golf ball according to claim 13, wherein the rubber composition contains (d) the branched carboxylic acid having 3 to 30 carbon atoms and/or the salt thereof in an amount ranging from 1 part by mass to 18 parts by mass with respect to 100 parts by mass of (a) the base rubber.

15. The golf ball according to claim 13, wherein if the JIS-C hardness of the spherical core is measured at nine points obtained by dividing the spherical core radius into equal 12.5% intervals, including the core center and the core surface, and the hardness values are plotted in a graph against distance (%) from the core center, then $R^2$ of a linear approximation curve obtained from a least square method of the graph is 0.95 or higher.

16. The golf ball according to claim 13, wherein the spherical core surface hardness Hs differs from the core center hardness Ho in JIS-C hardness by a difference (Hs−Ho) in a range of from 30 to 50.

17. The golf ball according to claim 13, wherein (d) the branched carboxylic acid and/or the salt thereof is a saturated branched carboxylic acid and/or a salt thereof.

18. The golf ball according to claim 13, wherein the spherical core has a center hardness of 30 or more and 49.4 or less in JIS-C hardness.

* * * * *